April 21, 1953 — J. COHEN — 2,635,664
LADY'S HANDBAG
Filed March 7, 1950 — 5 Sheets-Sheet 1

INVENTOR.
JOSEPH COHEN
BY James and Franklin
ATTORNEYS.

April 21, 1953            J. COHEN            2,635,664

LADY'S HANDBAG

Filed March 7, 1950            5 Sheets-Sheet 2

INVENTOR.
JOSEPH COHEN
BY James and Franklin
ATTORNEYS.

April 21, 1953  J. COHEN  2,635,664
LADY'S HANDBAG

Filed March 7, 1950  5 Sheets-Sheet 3

INVENTOR.
JOSEPH COHEN
BY James and Franklin
ATTORNEYS.

April 21, 1953 J. COHEN 2,635,664
LADY'S HANDBAG
Filed March 7, 1950 5 Sheets-Sheet 4

INVENTOR.
JOSEPH COHEN
BY James and Franklin
ATTORNEYS.

April 21, 1953   J. COHEN   2,635,664
LADY'S HANDBAG
Filed March 7, 1950   5 Sheets-Sheet 5

INVENTOR.
JOSEPH COHEN
BY
James and Franklin
ATTORNEYS.

Patented Apr. 21, 1953

2,635,664

UNITED STATES PATENT OFFICE 2,635,664

LADY'S HANDBAG

Joseph Cohen, New York, N. Y., assignor to James Arden, New York, N. Y.

Application March 7, 1950, Serial No. 148,248

13 Claims. (Cl. 150—28)

This invention relates to ladies' handbags, especially reversible handbags, and more particularly to handbags closed by a drawstring.

The primary object of the present invention is to generally improve ladies' handbags. A more particular object is to provide a lady's handbag which may be closed by drawstring handles and which may be opened by means of convenient rigid pull rings, yet which is reversible. In a preferred form the handbag is made of contrasting materials in order to present a different appearance when reversed, and the materials are preferably washable fabrics for summer use.

Still further objects of the present invention are to provide such handbags in varied forms, as, for example, flat, satchel-like, or pouch-like, and with a collar which may be a wide downturned flap or a narrow stand-up collar, and which collar may be plain or ornamental in shape. In accordance with a further feature and object of the invention, the handbag may if desired be provided with ornamental corners which expose the inside fabric for contrast, and the top of the handbag when opened may be of different desired shape, for example, a long, narrow slit, or a rectangular or square opening.

To accomplish the foregoing general objects, and other more specific objects which will hereinafter appear, my invention resides in the drawstring and reversible handbag elements and their relation one to another, as are hereinafter more particularly described in the following specification. The specification is accompanied by drawings, in which:

Figures 1, 2, 3, 4, 5, 6, 7:
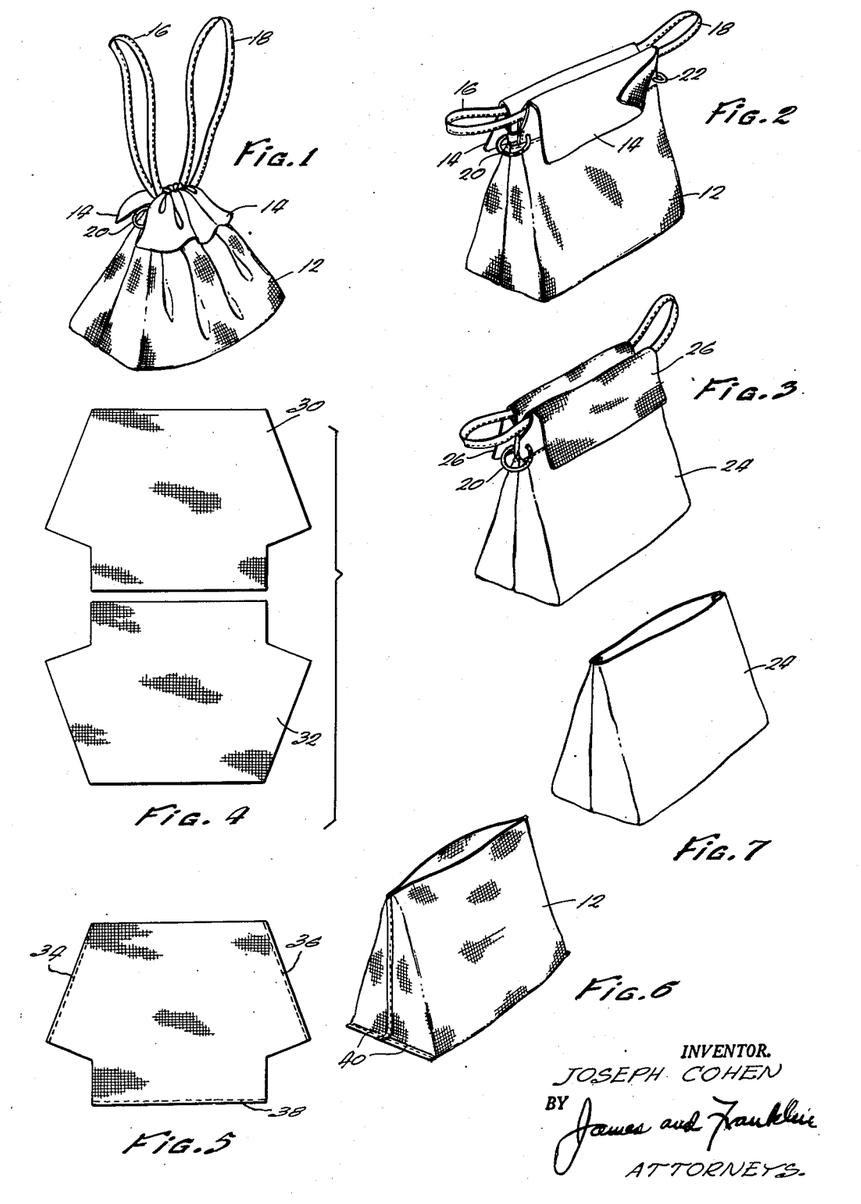
Fig. 1 is a perspective view of one form of handbag embodying features of my invention.
Fig. 2 shows the same in opened condition.
Fig. 3 shows the same open and reversed.
Figs. 4–7 are explanatory of the method of making the inner and outer covers or bag body.

Referring to the drawing, and more particularly to Figs. 1 and 2, the lady's handbag there shown comprises not only the outside cover 12, but also an inside cover which acts temporarily as a lining for the outside cover. There are collar pieces 14 secured along the top edge of the covers and two drawstring handles 16 and 18. The collars 14 act as open-ended hems providing tracks for the two handles 16 and 18. There are also relatively large metal pull rings 20 and 22 secured to the ends of the bag. These facilitate instant convenient opening of the bag.

The arrangement is such that the bag is reversible, this being shown in Fig. 3 in which the material indicated on the collars 14 in Figs. 1 and 2 is now seen on the body of the bag at 24, while the material shown for the body of the bag in Figs. 1 and 2 is now shown at 26 for the collar. With either cover turned outward the bag may nevertheless be operated in the same way, that is, it may be closed by pulling the handles 16 and 18 as shown in Fig. 1, and it may be opened by pulling apart the rings 20 and 22 as shown in Figs. 2 and 3. When the bag is closed the handles are long enough to be carried on one's arm.

The inside and outside covers are preferably made of materials which contrast in appearance. In most cases the materials are both made washable, and may be of similar material but different in color. Thus as a random example it may be assumed that in Figs. 1 and 2 the outside cover 12 is pink, while the collars 14 are white, whereas in Fig. 3 the outside cover 24 is white, while the collars 26 are pink. To schematically show such contrast in appearance the parts 12 and 26 are cross-hatched, while the parts 14 and 24 are left white. It will be understood that either cover may be considered to be the outside cover, the other being another or inside cover which acts only temporarily as a lining, for by reversing the bag the inside cover becomes the outside cover, and the outside cover becomes the lining.

The method of making the bag shown in Figs.

Figure 8:
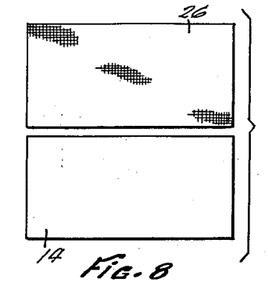
Figs. 8–11 are explanatory of the method of making the collars of the bag.
Figure 9:
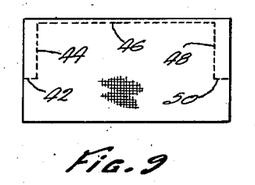
Figure 10:
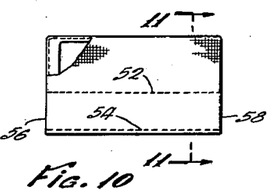
Figure 11:
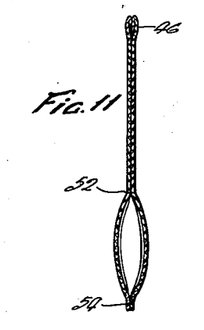
Figure 16:
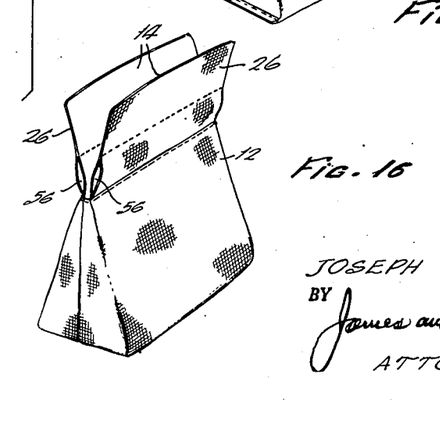

1, 2 and 3 may be described in detail with reference to Figs. 4 through 20 of the drawing. In brief outline, an outside cover is first tailored as shown in Figs. 4, 5 and 6; an inside cover is tailored as shown in Fig. 7; collar pieces are tailored, stitched and turned inside-out as shown in Figs. 8 and 9; and are then additionally stitched to form open-ended hems for the drawstring handles as shown in Figs. 10 and 11. The parts are then assembled and stitched together with the collar pieces between the inside and outside covers, and with the latter wrong-side out as shown in Figs. 12 through 15. The pieces are stitched together around the periphery of the covers except for a gap or opening clearly shown in Fig. 15 at 72, and the covers are turned through the gap to bring the right sides of the cover out, and to bring the collars outside the covers, as shown in Fig. 16, whereupon the gap is stitched to close the same. The drawstring handles and rings are then added, as shown in Figs. 17 through 20, to complete the bag. The method as generally outlined in the terms used above, is equally applicable to the various other forms of the invention to be described later.

Considering in greater detail the method of making the present somewhat satchel-shaped form of the bag, and reverting to Fig. 4, two pieces of fabric 30 and 32 are tailored as shown, superimposed, and then stitched together along the lines 34, 36 and 38, as is indicated by broken lines in Fig. 5 of the drawing. The particular tailoring shown, with sloping sides and notches at the lower corners, is intended to produce the satchel-shape, that is, rectangular sides and triangular ends. The seam 38 is then pushed upward and the seams 34 and 36 pushed downward to spread out the bottom of the cover, whereupon the open lower edges formed by the notches are stitched as is indicated at 40 in Fig. 6. It will be understood that the opposite end is similarly stitched, and that the result is a cover 12 arranged wrong-side out. It will also be understood that the pieces 30 and 32 shown in Fig. 4 may, if desired, be made of a single piece of fabric, thus eliminating the seam 38. However, in most cases it is preferred to make the cover of two pieces of fabric because of less waste or greater economy in cutting the pieces from a large sheet.

By following exactly the same steps, an inside cover may be made, but it is preferably made of contrasting material. After sewing the seams it is preferably inverted to bring the right side out as shown in Fig. 7. By later placing the inside cover 24 of Fig. 7 within the outside cover of Fig. 6 the two covers will be disposed with their right sides toward one another, or face-to-face, and with their wrong sides away from one another, both facing outwardly in a relative sense.

In the present case the collars are rectangular pieces of sufficient width to fall downwardly, thus forming ornamental flaps. The collars preferably are made of contrasting materials on opposite sides, and may be the same colors as the covers. For convenience, suppose the colors to be pink and white. Referring to Fig. 8, a rectangular piece of pink fabric is indicated at 26, and a rectangular piece of white fabric at 14. These are superposed and then stitched together on a broken line indicated at 42, 44, 46, 48 and 50 in Fig. 9. The resulting piece is then turned inside-out, as shown in Fig. 10, and is preferably stitched horizontally as indicated at 52, thus closing the flap portion of the collar at all four edges, and leaving the drawstring hem or guide track portion of the collar open on three sides. If desired a line of stitching may be provided as indicated at 54, thus finishing the hem or track, and leaving the collar open solely at the track ends 56 and 58. However, in practice the seam 54 may be omitted, for an equivalent seam is provided later when attaching the collar to the covers.

Figure 12:
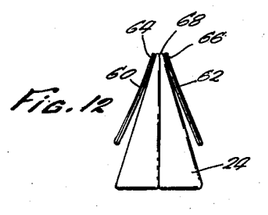
Figs. 12–16 are explanatory of the method of assembly of the collars and the covers.
Figure 13:
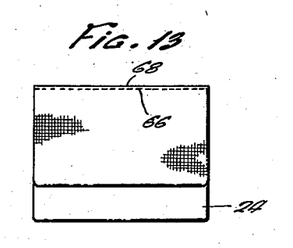
Figure 14:
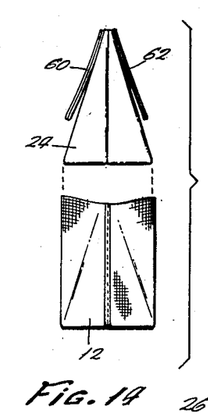
Figure 15:
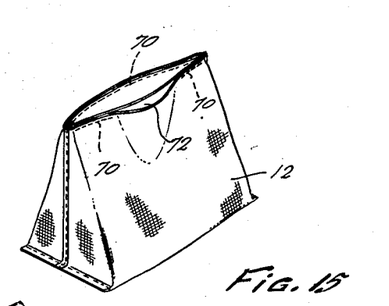

Referring now to Figs. 12 and 13, the resulting collars 60 and 62 may if desired be temporarily stitched to the outside of the inside cover (in this case the white cover 24 previously shown in Fig. 7). The lines of stitching are indicated at 64 and 66. If the collar is white on one side and pink on the other as previously supposed, the pink side is disposed outward. The top of the cover, of course, is still open at 68, the stitching 64 going through only one side of the cover, and the stiching 66 going through only the other side of the cover. This sub-assembly of the inside cover 24 with the collars 60 and 62 is then inserted within the outside cover or pink cover 12 previously shown in Fig. 6. In Fig. 14 the top of the outside cover is shown spread apart to facilitate insertion of the inside cover. The top edge or opening of the covers is then stitched, as is best shown at 70 in Fig. 15. This stitching is carried nearly all the way around the open top of the covers, but an opening or gap is intentionally left at a suitable point, here indicated at 72. It will be understood that the stitching 70 preferably passes through the collars as well as the covers. The stitching shown at 54 in Fig. 10 is not essential, because of the stitching shown at 64 and 66 in Fig. 12, and even that stitching is not essential, because of the stitching shown at 70 in Fig. 15. One operator may prefer to save stitching by holding the collar as well as the covers in alignment during the stitching operation at 70, while another may prefer to use the stitching 64 and 66 shown in Fig. 12 in order to simplify the subsequent assembly and the further stitching shown in Figs. 14 and 15.

The entire assembly of covers and collars is then turned through the gap or opening 72, thus bringing the right sides of the covers outermost, and bringing the collars outside the covers, as shown in Fig. 16. In this case the right side of the cover 12 or pink cover is shown outward. The collars are left raised for clarity. The open ends 56 of the hems for the drawstring handles are clearly shown.

Figure 17:
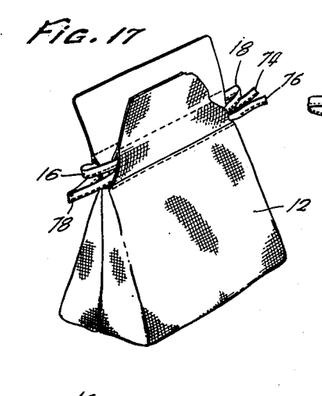
Figs. 17 and 18 show the addition of the drawstring handles.
Figure 18:
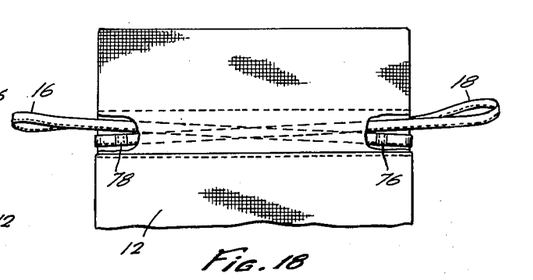

Referring now to Fig. 17, the handles are preferably flat, double-walled tapes made by a folding and stitching operation. A first handle 16 has its ends passed through the hems, the open ends being shown at 74 and 76. These ends are temporarily stitched together to guard against removal, as is indicated at 78 for the second handle 18. In order to conceal the stitched ends the rounded or continuous ends 16 and 18 are pulled apart somewhat, as shown in Fig. 18, thus removing any slack at the stitched ends, and the handles are preferably further pulled slightly at one side in order to bring the stitched ends within the hem a slight distance, as suggested in Fig. 18. At the same time they are also moved downward so that the free handles occupy the upper portion of the hem at the ends of the bag, while the stationary ends occupy the lower portion of the hem at the opposite ends of the bag. The ends are preferably stitched or tacked through the material of the collars. The handles may be tacked to one collar or to both collars, preferably the latter, and the stitching is preferably near the end of the bag as indicated at 82 in Fig. 19, in order not to excessively reduce the length of the opening at the top when the bag is fully opened, or reversed.

Figure 19:
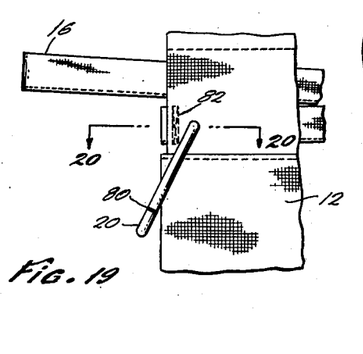
Figs. 19 and 20 show the addition of the pull rings.
Figure 20:
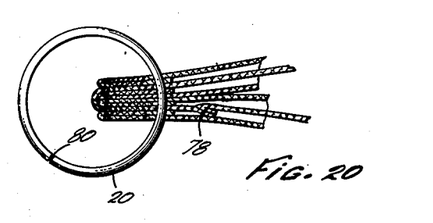

Referring now to Figs. 19 and 20, a hole is punched through the bag, and a ring 20 is passed through the hole. The ring is preferably a split metal ring, the split being indicated at 80. The metal is soft enough to permit the ends of the ring to be bent laterally or offset to form an opening which facilitates passing the ring through the hole, whereupon the ends are bent back into alignment. This same procedure may be followed if it be desired to remove the ring during laundering of the bag in the case of a washable bag. The hole for the ring is preferably made through the collars and the fixed end of the handle, as shown in Figs. 19 and 20. The bar stitching which tacks or anchors the handle to the collars of the bag is indicated at 82 in Fig. 19, and may be independent of the stitching at 78 shown in Figs. 17, 18 and 20 for closing the open ends of the handle. The ring is preferably located as shown, first in order to provide a large body of material receiving the ring in order to provide strength against tearing if the rings are pulled apart with considerable force, and second because this location of the ring helps additionally secure together the collars and the handle.

It should be understood that when it is desired to reverse the handbag it is merely necessary to turn the same inside out and to slide some of the material about the rings so as to bring the body of the rings outside the inverted bag. The handles remain outside in either position of the bag.

Figure 21:
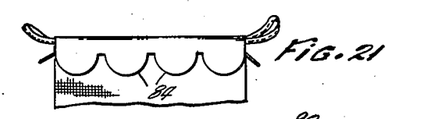
Fig. 21 is an elevation of a modification with a collar having an ornamental shape.

Before leaving this form of the bag it may be well to point out that the downwardly hanging collars or flaps may, if desired, be given an ornamental outline, one such outline being shown at 84 in Fig. 21 of the drawing. Reverting to Fig. 9, the sole difference in manufacture is that the pieces 26 and 14 are given the desired ornamental outline, and the straight line of stitching shown at 46 becomes a curved line of stitching conforming to the desired ornamental outline.

Figure 22:
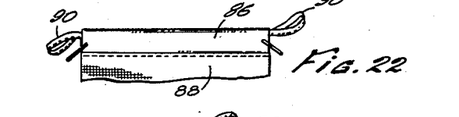
Fig. 22 is an elevation of a modification having a very narrow stand-up collar.

It should also be understood that the collar need not be made so wide a collar as to fall downward. It may be a narrow collar which stands up, and such collars are shown in the forms of the invention described later in connection with Figs. 24, 31 and 38. In an extreme case the collar may be made no wider than the hem or track which receives the drawstring, and such an arrangement is shown in Fig. 22, in which it will be seen that the collars 86 secured above the covers 88 are open at the ends to carry the handles 90. In all cases rings may be provided as shown in the drawing. Figs. 21 and 22 show only the upper part of the bag.

Figure 23:
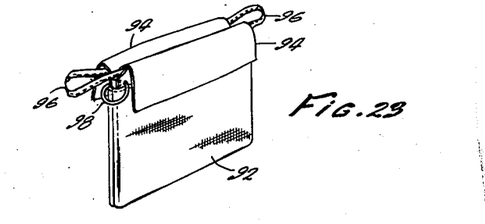
Fig. 23 shows a modification in which the bag is a flat envelope type bag.

The body of the bag may be a flat envelope instead of having a satchel-shape or flat bottom. Such a bag is shown in Fig. 23, and it will be understood that here again there is an outside cover 92; an inside cover, not shown; and a pair of collars 94 which in the present case are wide and flap downward, as was described in connection with Figs. 2 and 3. There are also drawstring handles 96, and rings 98. It will be understood that the only difference in the manufacture of this bag is that the pieces shown in Fig. 4 of the drawing will be simple rectangles, instead of being tailored to the shape there shown. A single piece may be folded and stitched at both ends, there being no reason in this case to make the bag of two separate pieces. However, if two separate pieces are employed they would have stitching along the bottom and two ends, the top edge being left open.

Figure 24:
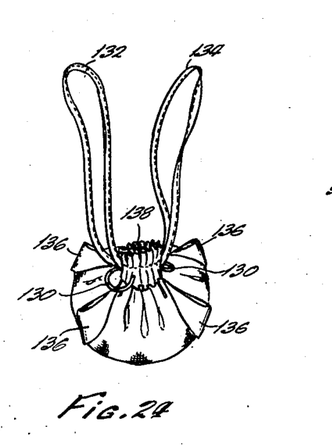
Fig. 24 shows a modified bag in closed condition, the said bag being pouch-like and having ornamental corners.
Figure 31:
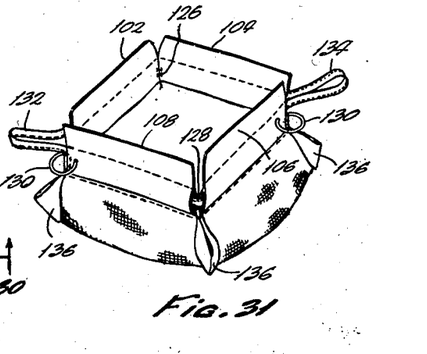
Fig. 31 shows the handbag of Fig. 24 in fully opened condition.
Figure 32:
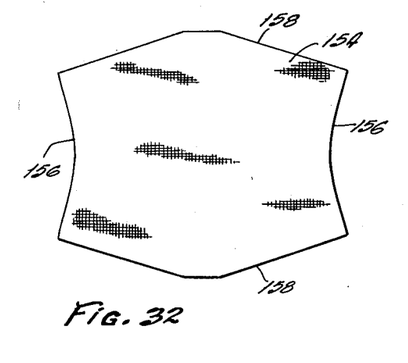
Figs. 32–37 are explanatory of the method of making still another modified bag.
Figure 33:
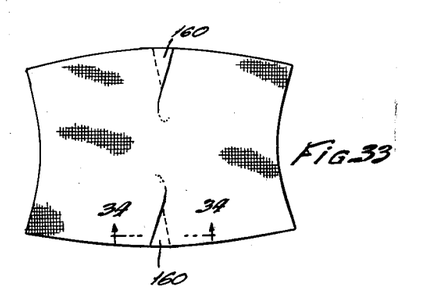
Figure 34:
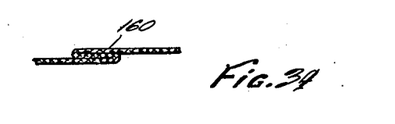
Figure 35:
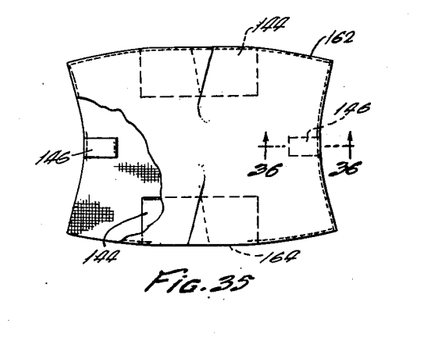
Figure 36:
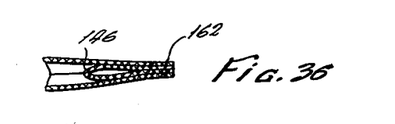
Figure 37:
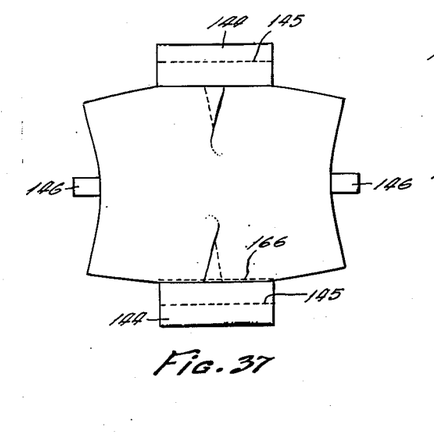

Still another form of handbag embodying features of the present invention is shown in Figs. 24 and 31 of the drawing. One difference is that the top of the bag may be opened to a square opening, as shown in Fig. 31, instead of a long narrow slit. Another difference is that there are ornamental corners where excess material is turned inside-out to provide a contrasting appearance. A third difference is that the body of the bag is pouch-like, it being formed of initially flat material.

The method of making the bag may be described with reference to Figs. 25 through 30 of the drawing. Four collars are first made, and these may be made exactly as described in connection with Figs. 8 through 11. However, in the present case the collars are somewhat shorter than those previously described, and are preferably narrower in order to act as stand-up collars. The collars may be made of a single piece of material, although, if desired, they may be made of two contrasting materials as previously described. For example, in the present case one outer cover of the bag may be made of white material with a figure or multi-colored polka dots printed thereon, the other cover being made of plain white material. In such case the collars may be made of plain white material on both sides. When the figured side is outermost it is contrasted by the white collar and by the white corners. When the white side of the bag is outermost the collars are also white, but there is an adequate ornamental contrast at the corners, which now will be figured or dotted.

It will be understood that if a collar is made with contrasting sides it is made of two pieces of fabric, exactly as described in connection with Figs. 8, 9 and 10, but that if the collar is made the same on both sides, it may be made of a single piece of fabric having the dimension of the two pieces. This double piece is folded downward and is then stitched at the sides with lines of stitching corresponding to the lines 42, 44, 48 and 50 shown in Fig. 9. The horizontal seam 46 is omitted, it being replaced by the fold of the fabric. The piece with the corners stitched as described is then turned inside-out and has added thereto a horizontal line of stitching corresponding to that shown at 52 in Fig. 10, and shown at 53 in Fig. 25. The line of stitching shown at 54 in Fig. 10 is optional and often omitted.

Figures 25, 26, 27, 28, 30:
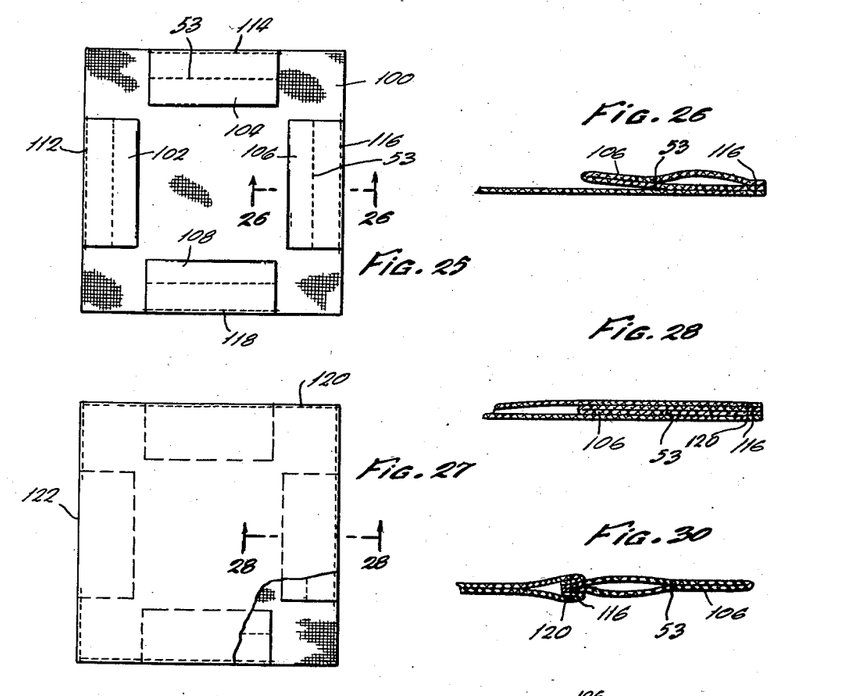
Figs. 25–30 are explanatory of the method of making the bag shown in Fig. 24.

Referring now to Fig. 25, a relatively large square piece of fabric 100 is prepared, and may for the present purpose be called the outside cover. From one viewpoint it may be said that said cover is tailored, but in this case the tailoring is quite simple, it consisting merely in cutting the piece to desired dimension. The four previously made collars 102, 104, 106 and 108 are laid on the outside cover 100 and are stitched thereto by lines of stitching 112, 114, 116 and 118. See also Fig. 26, a section drawn to enlarged scale. These lines are at the open edge of the collar and correspond to the seams 64 and 66 in Fig. 12, and also to the seam 54 shown in Fig. 10. It is primarily because of the seams 112, 114, etc., that the seam 54 of Fig. 10 may be omitted. The collars are symmetrically disposed on the fabric, that is, they are centered along each of the edges.

A second piece of fabric, which may be referred to as the inside cover, is then placed over the collars and the outside cover, and is stitched thereto almost entirely around the periphery. If the fabric has a wrong side and a right side, it will be understood that at this time the wrong sides are outermost, the right sides being face-to-face. The peripheral line of stitching is indicated at 120 in Fig. 27, and also in Fig. 28, a fragmentary section drawn to enlarged scale. The peripheral stitching is incomplete in that a gap or opening is left as indicated at 122, through which the material may be turned. When the material is turned through the opening 122 it takes the appearance shown in Fig. 29, the covers then being right-side out; the collars being right-side out; and the collars being disposed outside the covers. See also Fig. 30, a section drawn to enlarged scale. The gap or missing stitching is then completed as shown at 124 in Fig. 29 to close the opening.

In passing it may be mentioned that it is not essential to preliminarily sew the collars to the outside cover as shown in Fig. 25, for, if desired, the operator may hold the collars in place between the covers when making the peripheral seam 120 shown in Fig. 27, thus relying on the said seam to hold the collars to the covers, as well as to hold the covers together. However, some operators prefer to make the extra seams shown in Fig. 25 in order to simplify the later operation of making the peripheral seam 120 shown in Fig. 27.

Figure 29:
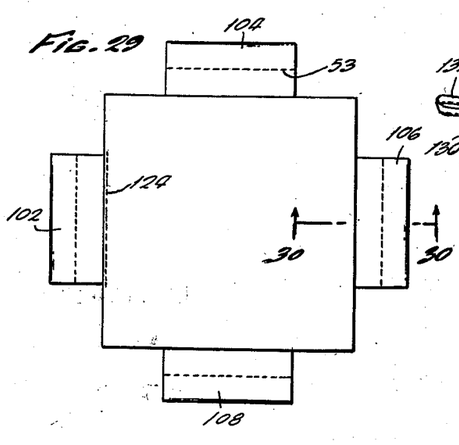

After the bag has reached the stage shown in Fig. 29, it is completed much as previously described, one difference being that the adjacent inside edges of the collars 102 and 104 are sewed and tacked together as indicated at 126 in Fig. 31, and that the diagonally opposite inside edges are similarly tacked together at 128. This limits the opening of the bag when the rings 130 are pulled apart to open the bag. The handles 132 and 134 are passed through the hem or track portions of the collars, just as previously described, one end of handle 134 being passed through collar 104 and collar 102, and the other end being passed through collar 106 and collar 108. The free ends are sewed together and the seam is then pulled back into one of the collars to conceal the same. The fixed or left-hand end of handle 134 is tacked to the adjacent ends of the collars at the ring, and the parts are additionally held together by the ring itself, all as previously described. Similarly, one end of handle 132 is passed through collars 102 and 104, while the other end is passed through collars 108 and 106, whereupon the free ends are sewed together and the connection pulled back into one of the collars to conceal the same. The stationary or right end of handle 132 is stitched or tacked to the adjacent ends of the collars 104 and 106 near the lower end of the opening, and the ring is passed through the material.

The resulting handbag has four corners of loose or free material, this being the material seen in Fig. 29 between the ends of the collars, the collars being only about one-half the length of the side of the cover. The said material is preferably turned downward or inside-out, as shown at 136 in Fig. 31. Inasmuch as it is usually of contrasting color or pattern, the inverted corners constitute an effective ornamentation of the bag. As before, the bag is closed by simply pulling the handles 132 and 134, which then act as carrying handles, as is best shown in Fig. 24. To open the bag it is merely necessary to pull apart the large easily grasped metal rings 130. The collar here shown is a relatively narrow stand-up collar, and it pleats or ruffles as is indicated at 138. The ornamental corners 136 become even more conspicuous.

Figure 38:
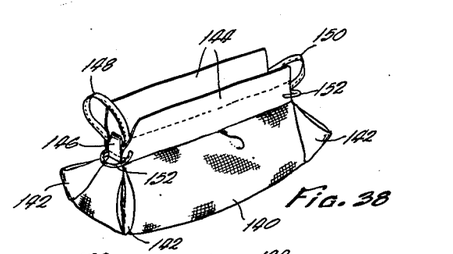
Fig. 38 is a perspective view showing the modified bag in open condition.

Ornamental corners of the character just described may be employed on a bag which is rectangular rather than square, or which has a relatively long narrow opening instead of a square opening. Such a bag is shown in open condition in Fig. 38. The bag is not shown in closed condition, but when closed has an overall appearance not very different from that shown in Fig. 24. In Fig. 38 it will be seen that the bag has an outside cover 140 and an inside cover, portions of which are revealed at the corners 142. In this case there are two side collars 144 and two end collars 146, the side collars having substantially the length of the bag, while the end collars are extremely short. As before, there are drawstring handles 148 and 150 which pass through at least some of the collars, and rings 152 which facilitate opening the bag.

The method of making this bag may be described with reference to Figs. 32 through 39. An outside cover is tailored as shown at 154 in Fig. 32. It is generally rectangular in shape, but the appearance of the bag may be enhanced by making the ends somewhat concave as shown at 156, and the sides somewhat convex as shown at 158. The center portions of the side edges are folded over or pleated, and a few stitches taken to hold the same in shape, as indicated at 160 in Figs. 33 and 34. Four collars are then made up, these being indicated at 144 and 146 in Fig. 35.

The collars 144 may be made exactly as decribed in connection with Figs. 25-31, and preferably are made out of a single piece of material folded at the top edge. However, they are of greater length, and equal the length of the top of the bag when open. The end collars 146 are made in substantially the same way except that these collars are preferably only as high as the hem or track for the handles, and therefore there is no reason to include a line of horizontal stitching corresponding to the line 52 shown in Fig. 10, or 53 shown in Fig. 25, or 145 shown in Fig. 37. The end collars 146 are similar to the narrow collars shown at 86 in Fig. 22, except that the collars 146 are exceedingly short, and in effect amount merely to tabs of material used at the ends of the bag for a purpose later described. In any event, the four collars may be stitched to the outside cover, the long collars centered at the long edges, and the short collars centered at the short edges of the cover. This step corresponds to that shown in Fig. 25 of the drawing.

An inside cover is then made exactly as described for the outside cover and is laid over the collars and the outside cover. The parts are then stitched together by a peripheral line of stitching shown at 162 in Figs. 35 and 36, which line is left incomplete, there being a gap or opening, here shown at 164. It will be understood that at this time the covers are disposed right-side to right-side, or with their wrong sides outermost. The covers are then turned right-side out through the opening 164, the parts then having the relation shown in Fig. 37, in which the covers are right-side out; the collars are right-side out; and the collars are disposed outside the covers. The gap is stitched to close the opening, as is indicated at 166 in Fig. 37.

Figure 39:
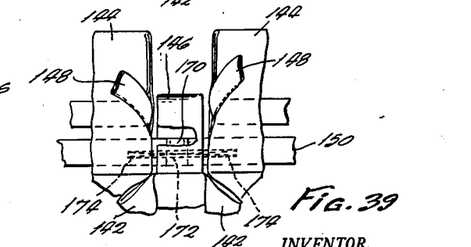
Fig. 39 is a fragmentary end view drawn to enlarged scale.

To complete the bag it is merely necessary to add the handle and the rings. Referring to Fig. 38, the handle 150 passes through the side collars 144 and the end collar 146 at the left end of the bag, but does not pass through the end collar at the right end of the bag. Similarly, the handle 148 passes through the side collars 144 and the end collar (not visible) at the right end of the bag, but does not pass through the end collar 146 at the left end of the bag. As before, the free ends of the handle are stitched together and are then pulled into one of the collars to conceal the same. The fixed end of the handle is stitched or tacked to the end collar 146. Referring to Fig. 39, the stitched ends 170 of the handle 150 have been pulled into the end collar 146, and have been stitched in place by bar stiching indicated at 172.

This bar stitching is preferably carried sideward as indicated at 174, thereby anchoring the ends of the side collars 144 to the end collar 146, which in turn is desirable in order to prevent any possibility of the bag being pulled out to substantially flat condition, or, in other words, to prevent any separation at the upper ends of the open corners of the bag. It will be understood, however, that if desired the adjacent corners of the collars may be stitched together by separate stitching localized to one side of the hem openings, in which case the stationary end of the handle may be secured to the end collar alone. It will be understood that this stitching last referred to is merely for convenience in preventing elliptical sliding or sliding of the opposite sides of the handle through the collars in such a way as might bring the stitched end of the handle out to exposed position where it would somewhat mar the beauty of the bag. It will also be understood that the extension of the bar stitching 172 to the ends 174 shown in Fig. 39 is merely a convenient and very rapid way to accomplish the desired anchorage of the adjacent ends of the collars to one another, the fixed part of the handle aiding that purpose.

The rings 152 are passed through the ends of the bag much as previously described. The ring preferably passes through the ends of the two side collars, and preferably at the lower portion of the hem where the ring also passes through the stationary portion of the handle.

As before, the projecting corners of the cover material are free and may be turned inside-out to expose the inside material in order to ornament the bag. The concave shape indicated at 156 in Fig. 32 has the advantage of somewhat sharpening the corner of material which is turned inside-out, and this in turn helps keep the material tautly in the desired inverted condition.

It will be understood that the bags shown in Figs. 24, 31 and 38 may be reversed, just as was the case with the bag shown in Figs. 2, 21, 22 and 23. For this purpose it is merely necessary to turn the bag inside-out, to then work the material about the rings a bit to bring the larger part of the ring outside the bag, and finally, to reverse the free material at the corners in order to expose the inside material outward.

It is believed that the improved reversible lady's handbag of my invention, and the method of making the same, as well as the advantages thereof, will be apparent from the foregoing detailed description. It will also be apparent that while I have shown and described the invention in several preferred forms, changes may be made in the structures shown, without departing from the scope of the invention as sought to be defined in the following claims.

I claim:

1. A reversible lady's handbag comprising an outside cover, an inside cover disposed inside the outside cover and then temporarily acting as a lining for the outside cover, collar pieces secured along the top edge of the covers, two drawstring handles, said collar pieces acting as open-ended hems providing tracks for the two handles, a relatively large metal pull ring passing slidably through the collar pieces at one end of the bag, and another ring passing slidably through the collar pieces at the opposite end of the bag, the arrangement being such that the bag is reversible, and with either cover turned outward the main body of the rings may be disposed outside the bag, so that the bag may be closed by pulling the handles and may be opened by pulling the rings.

2. A reversible lady's handbag comprising an outside cover, an inside cover disposed inside the outside cover and then temporarily acting as a lining for the outside cover, collar pieces secured along the top edge of the covers, two drawstring handles, said collar pieces acting as open-ended hems providing tracks for the two handles, one handle being a closed loop with the closed end secured in a collar piece near one end of the bag, and with the other end projecting from the other end of the bag, the second being a closed loop with its closed end secured in a collar piece at the latter end of the bag, and with its other end projecting from the first end of the bag, a relatively large metal pull ring passing slidably through the collar pieces at one end of the bag, and another ring passing slidably through the collar pieces at the opposite end of the bag, the arrangement being such that the bag is reversible, and with either cover turned outward the main body of the rings may be disposed outside the bag, so that the bag may be closed by pulling the handles and may be opened by pulling the rings the material of the inside cover differing in appearance from that of the outside cover, and said materials being washable.

3. A lady's handbag as defined in claim 1, in which the open top of the bag is long and narrow, and in which there are two relatively long collar pieces, each substantially as long as the bag, disposed at each side of the open top of the bag, with the free ends of the handles and the metal rings disposed at the ends of the collar pieces.

4. A lady's handbag as defined in claim 1, in which the covers have four edges, and in which there are four collar pieces secured to the four edges, each of said collar pieces being substantially shorter than the edge to which it is secured, the adjacent ends of at least some of the collar pieces being secured together, the corners of the covers beyond the collars being free and being adapted to be reversely folded outside the bag.

5. A lady's handbag as defined in claim 1, in which the covers are generally rectangular, and in which there are four collar pieces symmetrically secured to the four edges of the covers, two of the collar pieces being substantially longer than the other two, said longer collar pieces being secured at the longer edges of the covers, to act as side collars, the other two being very short and being secured at the middle of the shorter edges of the covers, to act as end collars, and in which one of the handles passes through an end collar and two side collars, it being exposed at the other end, while the other handle passes through the other end collar and the two side collars, it being exposed at the opposite end, said collars being secured in end-to-end relation to form a long narrow rectangular opening at the top of the bag, the corners of the covers outside the collars being free and adapted to be reversely folded outside the bag.

6. The method of making a lady's handbag which comprises tailoring an outside cover, tailoring an inside cover, tailoring and stitching collar pieces wrong-side out and turning the same right-side out, assembling said pieces and stitching the same together with the collar pieces between the outside and inside covers and with the latter wrong-side out, said pieces being stitched together around the periphery of the covers except for a gap, turning the covers through the gap to bring the right sides of the covers out and to bring the collar pieces outside the covers, stitching the gap to close the same, and passing two drawstring handles through the collar pieces.

7. The method of making a lady's handbag which comprises tailoring an outside cover wrong-side out, tailoring an inside cover which is similar but of material having a contrasting appearance, tailoring and stitching collar pieces wrong-side out and turning the same right-side out, assembling said pieces and stitching the same together with the collar pieces between the outside and inside covers and with the latter wrong-side out, said pieces being stitched together around the periphery of the covers except for a gap, turning the covers through the gap to bring the right sides of the covers out and to bring the collar pieces outside the covers, stitching the gap to close the same, passing two drawstring handles through the collar pieces, securing one end of one to one end of the bag and one end of the other to the other end of the bag, and adding pull rings to the ends of the bag to complete the bag.

8. The method of making a lady's handbag which comprises tailoring and stitching an outside cover wrong-side out, tailoring and stitching an inside cover which is similar but of material having a contrasting appearance, inverting the inside cover to be right-side out, tailoring and stitching collar pieces wrong-side out and turning the same right-side out, assembling said pieces and stitching the same together with the inside cover within the outside cover and the collar pieces between the outside and inside covers and with the latter wrong-side out, said pieces being stitched together around the periphery of the covers except for a gap, turning the covers through the gap to bring the right sides of the covers out and to bring the collar pieces outside the covers, stitching the gap to close the same, passing two drawstring handles through the collar pieces, securing one end of one to one end of the bag and one end of the other to the other end of the bag, and adding pull rings to the ends of the bag to complete the bag.

9. A reversible lady's handbag comprising an outside cover, an inside cover disposed inside the outside cover and then temporarily acting as a lining for the outside cover, collar pieces secured along the top edge of the covers, two drawstring handles, said collar pieces acting as open-ended hems providing tracks for the two handles, a relatively large metal pull ring passing slidably through the collar pieces at one end of the bag, and another ring passing slidably through the collar pieces at the opposite end of the bag, the arrangement being such that the bag is reversible, and with either cover turned outward the main body of the rings may be disposed outside the bag, so that the bag may be closed by pulling the handles and may be opened by pulling the rings, the material of the inside cover differing in appearance from that of the outside cover, and said materials being washable, the open top of the bag being long and narrow, and there being two relatively long collar pieces, each substantially as long as the bag, disposed at each side of the top, with the free ends of the handles and the metal rings disposed at the ends of the collar pieces, and the collar pieces being substantially wider than the open-ended tracks for the handles, whereby the excess width falls outwardly to ornament the bag.

10. A reversible lady's handbag comprising an outside cover, an inside cover disposed inside the outside cover and then temporarily acting as a lining for the outside cover, collar pieces secured along the top edge of the covers, two drawstring handles, said collar pieces acting as open-ended hems providing tracks for the two handles, the arrangement being such that the bag is reversible, and with either cover turned outward may be closed by pulling the handles, the covers having four edges, and there being four collar pieces secured to the four edges, each of said collar pieces being substantially shorter than the edge to which it is secured, the adjacent ends of at least some of the collar pieces being secured together, the corners of the covers beyond the collars being free and being adapted to be reversely folded outside the bag.

11. A reversible lady's handbag comprising an outside cover, an inside cover disposed inside the outside cover and then temporarily acting as a lining for the outside cover, collar pieces secured along the top edge of the covers, two drawstring handles, said collar pieces acting as open-ended hems providing tracks for the two handles, the arrangement being such that the bag is reversible, and with either cover turned outward may be closed by pulling the handles, the material of the inside cover differing in appearance from that of the outside cover, and said materials being washable, the covers each consisting of a square of fabric, and there being four collar pieces secured to the four sides of the square and each having a length approximately one-half the length of the side, and the adjacent ends of two collar pieces being secured together and the diagonally opposite adjacent ends of the opposite two collar pieces being secured together, the unsecured ends acting as the corners of the bag from which the handles project, and the free corners of the covers being reversely folded outside the bag to provide an ornamental contrast.

12. A reversible lady's handbag comprising an outside cover, an inside cover disposed inside the outside cover and then temporarily acting as a lining for the outside cover, collar pieces secured along the top edge of the covers, two drawstring handles, said collar pieces acting as open ended hems providing tracks for the two handles, the arrangement being such that the bag is reversible, and with either cover turned outward may be closed by pulling the handles, the covers being generally rectangular, and there being four collar pieces symmetrically secured to the four edges of the covers, two of the collar pieces being substantially longer than the other two, said longer collar pieces being secured at the longer edges of the covers to act as side collars, the other two being very short and being secured at the middle of the shorter edges of the covers to act as end collars, and one of the handles passing through an end collar and two side collars, it being exposed at the other end, while the other handle passes through the other end collar and the two side collars, it being exposed at the opposite end, said collars being secured in end-to-end relation to form a long narrow rectangular opening at the top of the bag, and the corners of the covers outside the collars being free and adapted to be reversely folded outside the bag.

13. A reversible lady's handbag comprising an outside cover, an inside cover disposed inside the outside cover and then temporarily acting as a lining for the outside cover, collar pieces secured along the top edge of the covers, two drawstring handles, said collar pieces acting as open-ended hems providing tracks for the two handles, the arrangement being such that the bag is reversible, and with either cover turned outward may be closed by pulling the handles, the covers being generally rectangular with the longer edges somewhat convex and the shorter edges somewhat concave, and there being four collar pieces symmetrically secured to the four edges of the covers, two of the collar pieces being substantially longer and substantially wider than the other two, said larger collar pieces being secured at the longer edges of the covers to act as side collars, the other two being very short and being secured at the middle of the shorter edges of the covers to act as end collars, and one of the handles passing through an end collar and two side collars, it being exposed at the other end, while the other handle passes through the other end collar and the two side collars, it being exposed at the opposite end, each handle being secured to its end collar and to the immediately adjacent ends of the side collars, whereby all four collars are secured in end-to-end relation, the corners of the covers outside the collars being free and adapted to be reversely folded outside the bag.

JOSEPH COHEN.

References Cited in the file of this patent

UNITED STATES PATENTS

| Number | Name | Date |
|---|---|---|
| 293,597 | Russell | Feb. 12, 1884 |
| 731,378 | Luther | June 16, 1903 |
| 1,404,528 | Jeffs | Jan. 24, 1922 |
| 1,681,922 | Boch | Aug. 28, 1928 |
| 1,706,330 | Sorg | Mar. 19, 1929 |
| 2,051,413 | Lowenstein | Aug. 18, 1936 |
| 2,487,145 | Kuhlman | Nov. 8, 1949 |

FOREIGN PATENTS

| Number | Country | Date |
|---|---|---|
| 125,568 | Great Britain | Apr. 24, 1919 |